(12) United States Patent
Cymbal et al.

(10) Patent No.: US 8,365,414 B2
(45) Date of Patent: *Feb. 5, 2013

(54) ROLLER BEARING ASSEMBLY

(75) Inventors: William D. Cymbal, Freeland, MI (US); Arthur W. Nellett, Davision, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 1000 days.

This patent is subject to a terminal disclaimer.

(21) Appl. No.: 12/336,135

(22) Filed: Dec. 16, 2008

(65) Prior Publication Data

US 2010/0150490 A1    Jun. 17, 2010

(51) Int. Cl.
 *B21D 53/10* (2006.01)
(52) U.S. Cl. ............... 29/898.061; 29/898; 29/898.04; 29/898.042; 29/898.06; 384/428; 384/434
(58) Field of Classification Search ....... 29/898–898.15; 384/447, 434, 507, 572
 See application file for complete search history.

(56) References Cited

U.S. PATENT DOCUMENTS

| 4,475,777 | A | * | 10/1984 | Hofmann et al. | ............. 384/572 |
| 4,603,982 | A |   | 8/1986  | Dittrich |  |
| 4,620,805 | A |   | 11/1986 | Belanger |  |
| 4,854,747 | A | * | 8/1989  | Siebert et al. | ................. 384/447 |
| 5,219,231 | A |   | 6/1993  | Sheedy |  |
| 5,630,669 | A |   | 5/1997  | Stewart |  |
| 7,270,484 | B2 |  | 9/2007  | Waseda |  |

FOREIGN PATENT DOCUMENTS

| EP | 0390784 B1 | 2/1996 |
| EP | 1600648 A2 | 11/2005 |
| JP | 1266321 | 10/1989 |
| WO | WO 8902989 | 4/1989 |

* cited by examiner

*Primary Examiner* — Richard Chang
(74) *Attorney, Agent, or Firm* — Cantor Colburn LLP (57) ABSTRACT

A bearing assembly includes an inner race having a first inner race half and a second inner race half, and an outer race having a first outer race half and a second outer race. The first inner race half and the second inner race half cooperate to define an inner annular groove, and the first outer race half and the second outer race half cooperate to define an outer annular groove. A plurality of rollers is disposed within the inner annular groove and the outer annular groove in rolling engagement with the inner race and the outer race. An inner coupling mechanism couples the first inner race and the second inner race together, and an outer coupling mechanism couples the first outer race and the second outer race together.

7 Claims, 8 Drawing Sheets

ROLLER BEARING ASSEMBLY

BACKGROUND OF THE INVENTION

1. Field of the Invention

The subject invention relates generally to a bearing assembly, and more specifically to a roller bearing assembly for rotatably supporting a first shaft member relative to a second shaft member.

2. Description of the Prior Art

Bearings often include an inner race, an outer race, and a plurality of rollers disposed between the inner race and the outer race to provide rolling engagement between the inner race and the outer race. The rollers are often supported by a cage disposed between the inner race and the outer race. The cage defines a plurality of openings, with one of the rollers disposed within each of the openings. The inner race and the outer race each define a plurality of grooves, with one of the rollers disposed within each of the grooves.

It is known to manufacture the inner race and the outer race from a polymer material, i.e., a plastic. When the inner race and the outer race are manufactured from a polymer, they are often formed in a die. However, when formed in a die, the grooves of the inner race and the outer race are required to be shallow to allow for removal of the inner race and the outer race from the die. The shallow grooves limits the polymer bearing to a low axial load capacity. Alternatively, it is known to mold the inner race and the outer race, and then machine the grooves into the inner race and the outer race. While machining the grooves after molding the inner race and the outer race permits deeper grooves, and thereby a higher axial load capacity, the machining process removes the outer layer of the polymer material, i.e., the skin of the polymer. Removal of the outer layer of the polymer material reduces the wear resistance of the polymer, thereby reducing the life expectancy of the bearing assembly.

SUMMARY OF THE INVENTION AND ADVANTAGES

The subject invention provides a bearing assembly. The bearing assembly comprises an inner race and an outer race. The outer race is concentric with the inner race about a longitudinal axis. The inner race includes a first inner race half and a second inner race half. The first inner race half and the second inner race half cooperate to define an inner annular groove. The outer race includes a first outer race half radially offset from the first inner race half. The outer race further includes a second outer race half radially offset from the second inner race half. The first outer race half and the second outer race half cooperate together to define an outer annular groove. The outer annular groove is radially offset from the inner annular groove about the longitudinal axis. A plurality of rollers are disposed within and between the inner annular groove and the outer annular groove. The plurality of rollers are in rolling engagement between the inner race and the outer race. An inner coupling mechanism couples the first inner race half and the second inner race half together.

Accordingly, the subject invention allows the inner race and the outer race to be formed in a die with deep roller grooves by forming the inner race and the outer race in halves and then coupling the halves together. Forming the inner race and the outer race with the deep groves in halves provides a high axial load capacity, while still permitting the halves to be removed from the die. Therefore, the subject invention provides a bearing assembly that permits casting deep grooves into the inner race and the outer race to provide a high axial load capacity without the need to machine the deep grooves into the inner race and the outer race, thereby retaining the outer layer of the polymer material and increasing the life expectancy of the bearing assembly.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION OF THE INVENTION

Referring to the Figures, wherein like numerals indicate corresponding parts throughout the several views, a first alternative embodiment of a bearing assembly is shown generally at 20. The bearing assembly 20 rotatably supports a first shaft member relative to a second shaft member as is well known.

Figure 1:
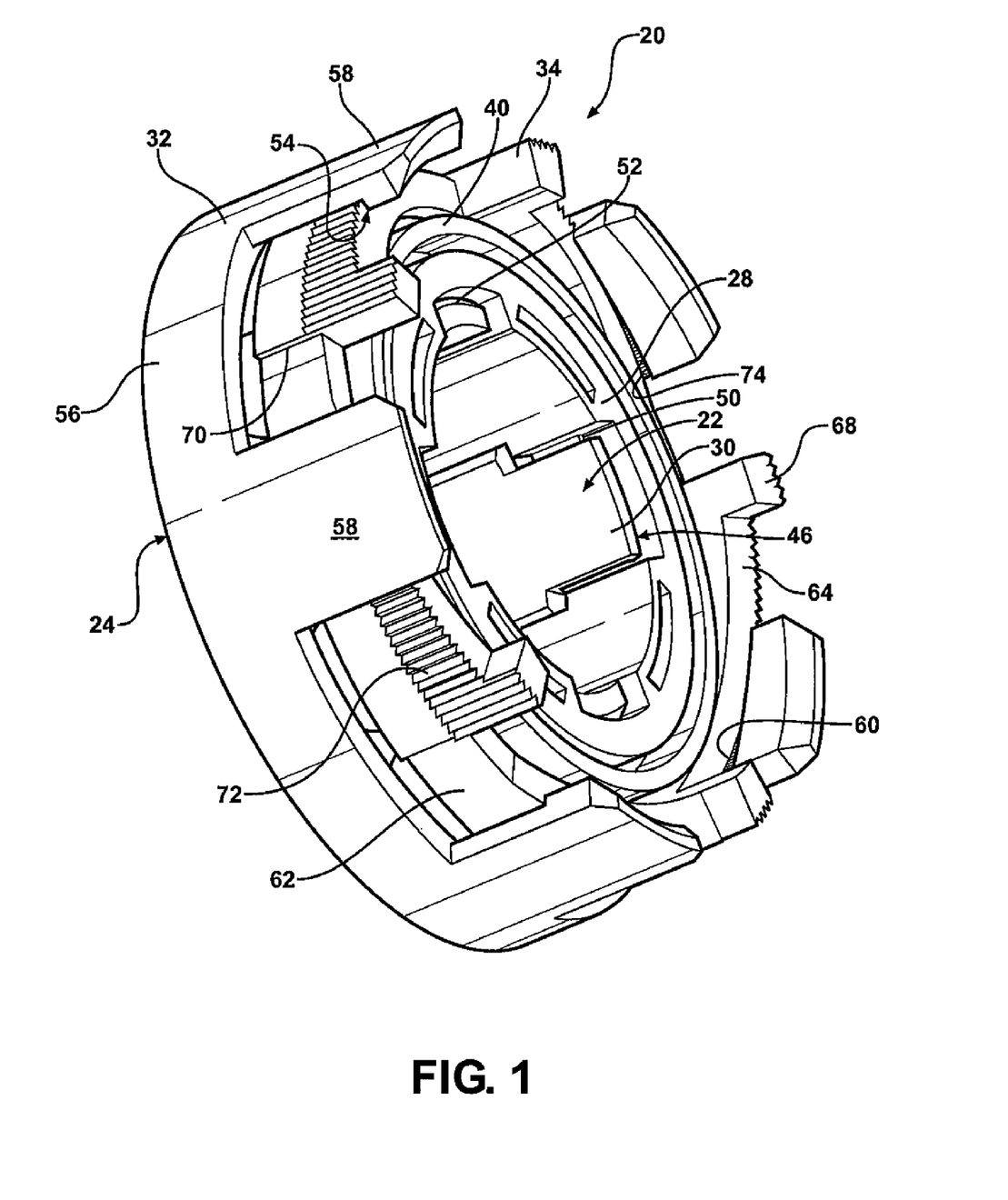
FIG. 1 is a perspective view of a first embodiment of a bearing assembly.
Figure 2:
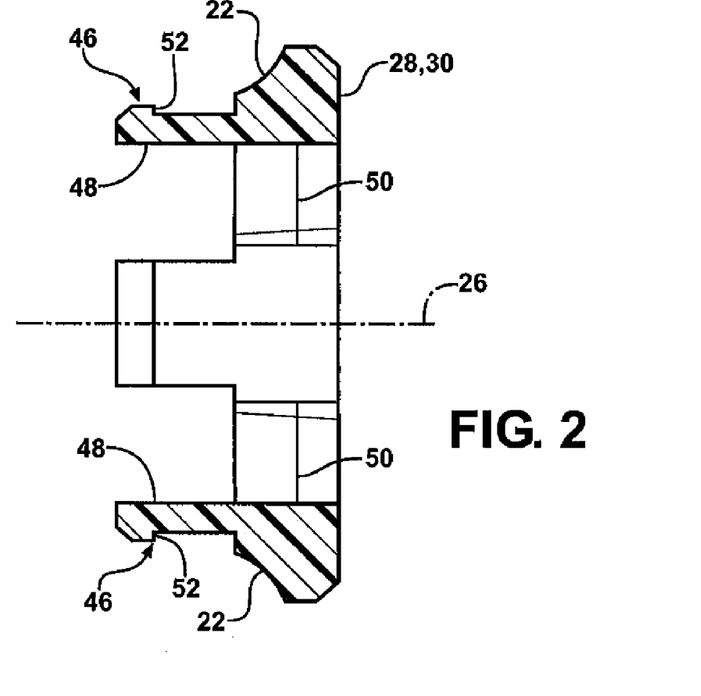
FIG. 2 is an exploded cross sectional view along a longitudinal axis of an inner race of the bearing assembly showing a first inner race half and a second inner race half.

Referring to FIG. 1, the bearing assembly 20 includes an inner race 22 and an outer race 24 concentric with the inner race 22 about a longitudinal axis 26. Referring also to FIG. 2, the inner race 22 includes a first inner race half 28 and a second inner race half 30. The outer race 24 includes a first outer race half 32 and a second outer race half 34. The first inner race half 28, the second inner race half 30, the first outer race half 32 and the second outer race half 34 may be formed from a polymer, i.e., a plastic. The polymer may include, but is not required to include, a nylon, such as nylon 6 or nylon 6/6. Alternatively, the polymer may include some other polymeric material. It should be appreciated that the first inner race half 28, the second inner race half 30, the first outer race half 32 and the second outer race half 34 may also be manufactured from and comprise some other material, such as a metal material, a ceramic material, or an acetal resin material. Delrin®, which is a registered trademark of E.I. du Pont de Nemours and company for an acetal resin, is especially well suited for manufacturing the inner race and the outer race.

As shown in the Figures, the inner race 22 and the outer race 24 are shown as independent features. However, it should be appreciated that portions of the inner race 22 and the outer race 24 may be incorporated into other manufactures, such as a drive shaft and/or a driven shaft. For example, one of the first inner race half 28 and the second inner race half 30 may be incorporated into and integral with a drive shaft, and one of the first outer race half 32 and the second outer race half 34 may be incorporated into and integral with a driven shaft. It should be appreciated that other combinations and configurations of the bearing assembly are possible.

Figures 10, 11:
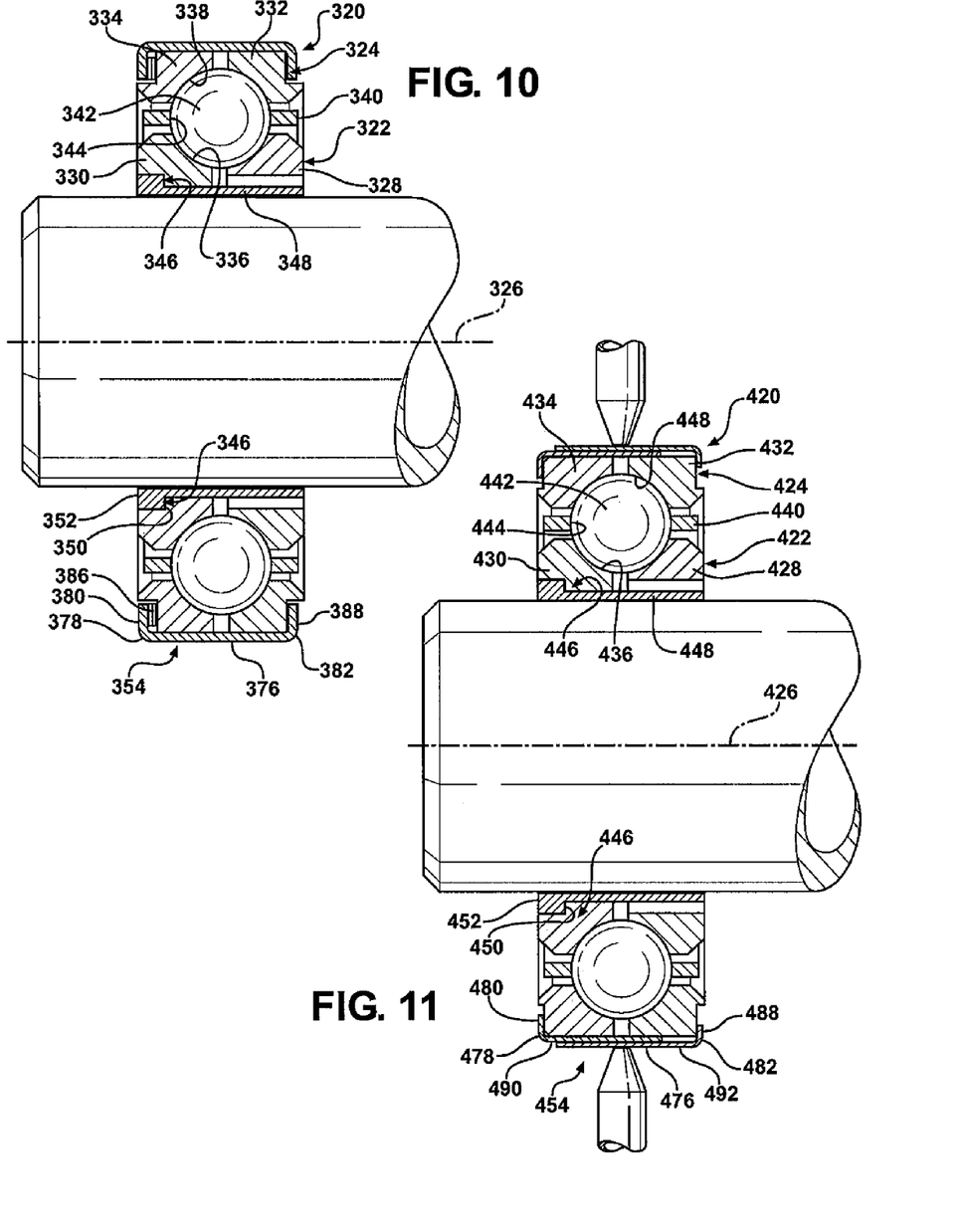
FIG. 10 is a cross sectional view along the longitudinal axis of a third alternative embodiment of the bearing assembly.
FIG. 11 is a cross sectional view along the longitudinal axis of a fourth alternative embodiment of the bearing assembly.
Figure 12:
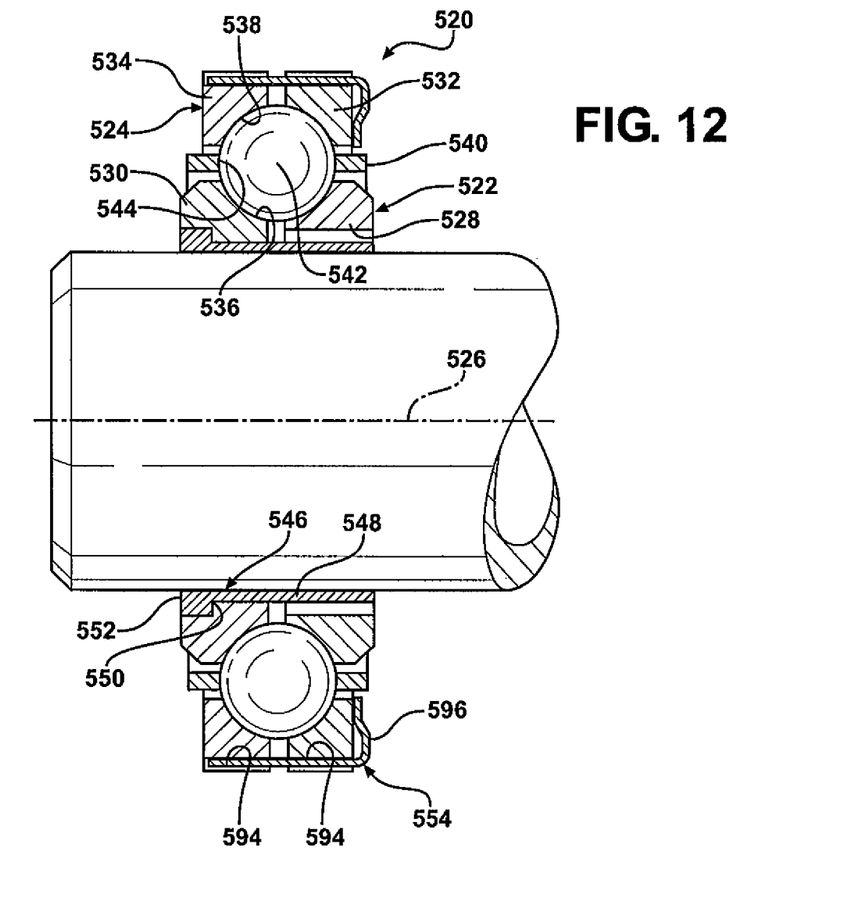
FIG. 12 is a cross sectional view along the longitudinal axis of a fifth alternative embodiment of the bearing assembly

As best shown in FIGS. 10-12, the first inner race half 28 and the second inner race half 30 cooperate to define an inner annular groove 36. The inner annular groove 36 encircles and is concentric with the longitudinal axis 26. Preferably, the inner annular groove 36 is generally concave relative to the longitudinal axis 26, and includes a semi-spherical cross sectional shape along the longitudinal axis 26. However, it should be appreciated that the inner annular groove 36 may define some other cross sectional shape along the longitudinal axis 26. Preferably, but not necessarily, the first inner race half 28 and the second inner race half 30 are symmetrical about a plane perpendicular to the longitudinal axis 26, i.e., the first inner race half 28 and the second inner race half 30 may be mirror images of each other.

The first outer race half 32 is radially offset from the first inner race half 28. The first outer race half 32 and the first inner race half 28 are similarly positioned along the longitudinal axis 26 relative to each other. The second outer race half 34 is radially offset from the second inner race half 30. The second outer race half 34 and the second inner race half 30 are similarly positioned along the longitudinal axis 26 relative to each other.

As best shown in FIGS. 10-12, the first outer race half 32 and the second outer race half 34 cooperate together to define an outer annular groove 38. The outer annular groove 38 encircles and is concentric with the longitudinal axis 26. Preferably, the outer annular groove 38 is generally convex relative to the longitudinal axis 26, and includes a generally semi-spherical cross sectional shape along the longitudinal axis 26. However, it should be appreciated that the outer annular groove 38 may include some other cross sectional shape along the longitudinal axis 26. The outer annular groove 38 is radially offset from the inner annular groove 36 about the longitudinal axis 26, and is similarly positioned along the longitudinal axis 26 relative to the inner annular groove 36.

Figure 3:
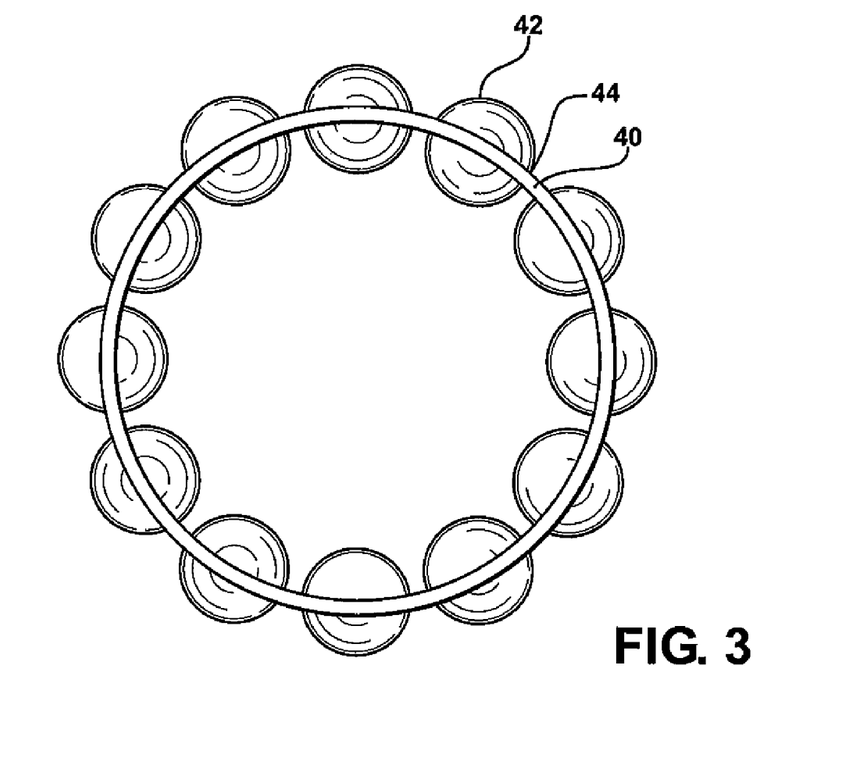
FIG. 3 is a cross sectional view perpendicular to the longitudinal axis of a cage assembly of the bearing assembly.
Figure 7:
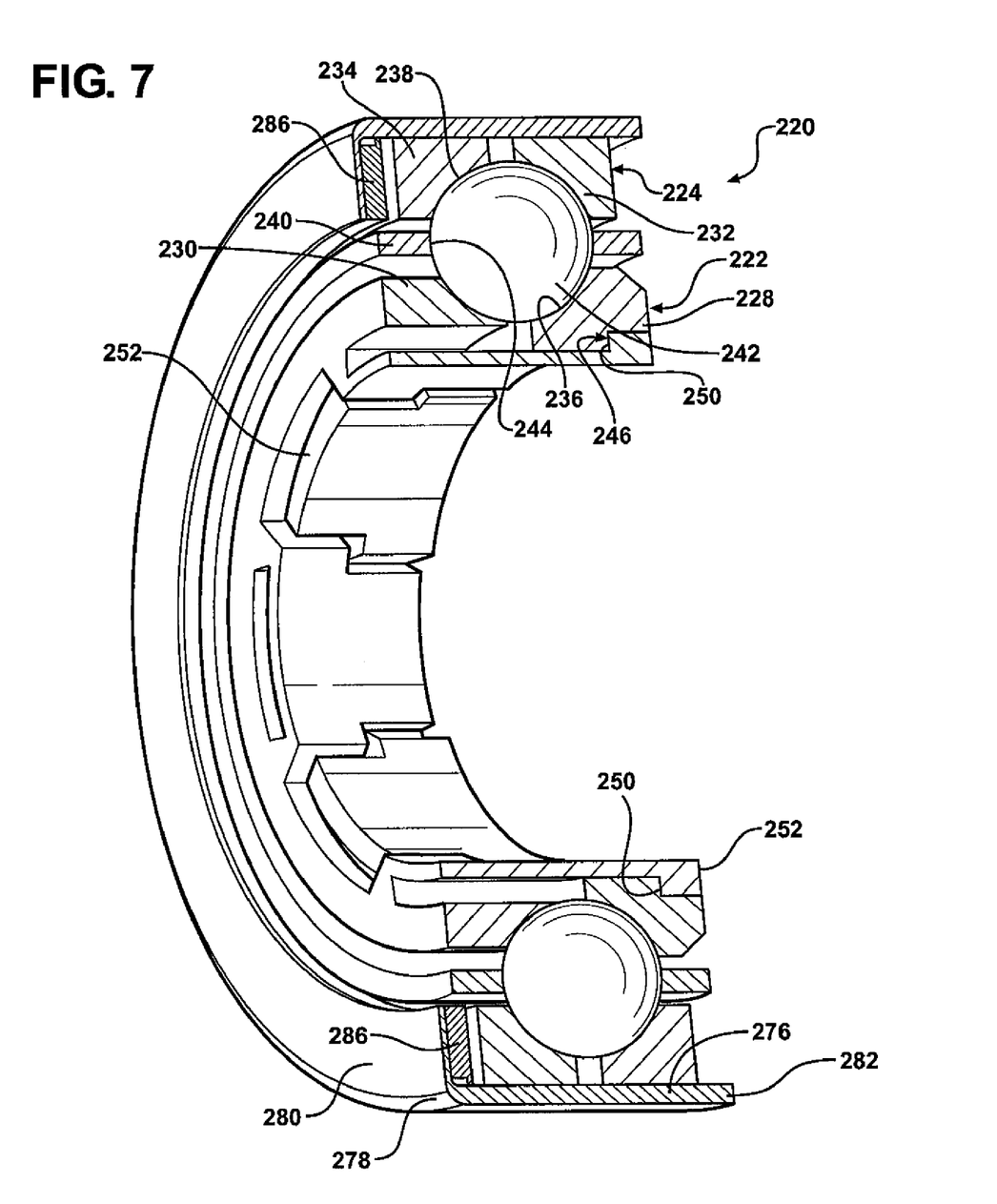
FIG. 7 is a perspective cross sectional view of the second alternative embodiment of the bearing assembly.

As best shown in FIG. 7, an annular cage 40 is disposed between the inner race 22 and the outer race 24. The annular cage 40 supports a plurality of rollers 42. The plurality of rollers 42 is disposed within and between the inner annular groove 36 and the outer annular groove 38. The plurality of rollers 42 is in rolling engagement with and between the inner race 22 and the outer race 24. The annular cage 40 defines a plurality of openings 44. Referring also to FIG. 3, one of the plurality of rollers 42 is disposed within each of the plurality of openings 44. It should be appreciated that the number of rollers 42 is identical to the number of openings 44, and the number of rollers 42 and openings 44 is variable. Preferably, the rollers 42 are evenly spaced radially about the longitudinal axis 26.

The annular cage 40 may be manufactured from and comprise any suitable material. Preferably, the annular cage 40 is manufactured from and comprises a plastic material. However, it should be appreciated that the annular cage 40 may be manufactured from and comprise some other material, such as a plastic material, a composite material, a ceramic material, an acetal resin material or some other suitable type of material not described herein.

Preferably, the rollers 42 include a spherical shape. However, it should be appreciated that the rollers 42 may include some other shape, such as cylindrical. It should also be appreciated that the cross sectional shape of the inner annular groove 36 and the outer annular groove 38 is dependent upon the shape of the rollers 42. The rollers 42 may be manufactured from and comprise any suitable material. Preferably, the rollers 42 are manufactured from and comprise steel. However, the rollers 42 may be manufactured from and comprise some other material, such as a plastic material, a composite material, a ceramic material, an acetal resin material or some other suitable type of material not described herein.

The bearing assembly 20 includes an inner coupling mechanism 46. The inner coupling mechanism 46 couples the first inner race half 28 and the second inner race half 30 together. The inner coupling mechanism 46 may include a snap fit connection or some other similar type of connecting mechanism, such as an interlocking mechanical connection. It should be appreciated that the inner coupling mechanism 46 may include some other type of connecting mechanism not shown or described herein. When coupled together, the first inner race half 28 and the second inner race half 30 are rigidly connected, i.e., attached together and are resistant to axial movement relative to each other along the longitudinal axis 26 and transverse movement relative to each other transverse to the longitudinal axis 26.

Referring to FIGS. 1 and 2, the inner coupling mechanism 46 includes a plurality of extensions 48 disposed on each of the first inner race half 28 and the second inner race half 30. The extensions 48 disposed on the first inner race half 28 and the second inner race half 30 engage the other of the first inner race half 28 and the second inner race half 30 in interlocking engagement. In other words, the extensions 48 on the first inner race half 28 engage the second inner race half 30, and likewise, the extensions 48 on the second inner race half 30 engage the first inner race half 28.

Each of the first inner race half 28 and the second inner race half 30 include a ledge 50. Each of the plurality of extensions 48 include a lip 52. The lip 52 on the extensions 48 engage and grasp the ledge 50 on the other of the first inner race half 28 and the second inner race half 30. In other words, the lip 52 on the extensions 48 of the first inner race half 28 engage the ledge 50 on the second inner race half 30, and likewise, the lip 52 on the extensions 48 of the second inner race half 30 engage the ledge 50 on the first inner race half 28.

Preferably, the plurality of extensions 48 are evenly spaced radially about the longitudinal axis 26 on both the first inner race half 28 and the second inner race half 30. Preferably, the number of extensions 48 on the first inner race half 28 is equal to the number of extensions 48 of the second inner race half 30. However, it should be appreciated that the number of extensions 48 on the first inner race half 28 may vary from the number of extensions 48 on the second inner race half 30.

Each of the first inner race half 28 and the second inner race half 30 define an inner circumference. The plurality of extensions 48 is disposed on the inner circumference of the first inner race half 28 and the second inner race half 30. In other words, the extensions 48 of the first inner race half 28 are disposed along the inner circumference of the first inner race half 28, and the extensions 48 of the second inner race half 30 are disposed along the inner circumference of the second inner race half 30.

An outer coupling mechanism 54 couples the first outer race half 32 and the second outer race half 34 together. The outer coupling mechanism 54 may include a snap fit connection, a ratchet type connection, or some other similar type of connecting mechanism. It should be appreciated that the outer coupling mechanism 54 may include other types of connecting mechanism not shown or described herein. When coupled together, the first outer race half 32 and the second outer race half 34 are rigidly connected, i.e., attached together, and are resistant to axial movement relative to each other along the longitudinal axis 26 and transverse movement relative to each other transverse to the longitudinal axis 26.

Figures 4, 5:
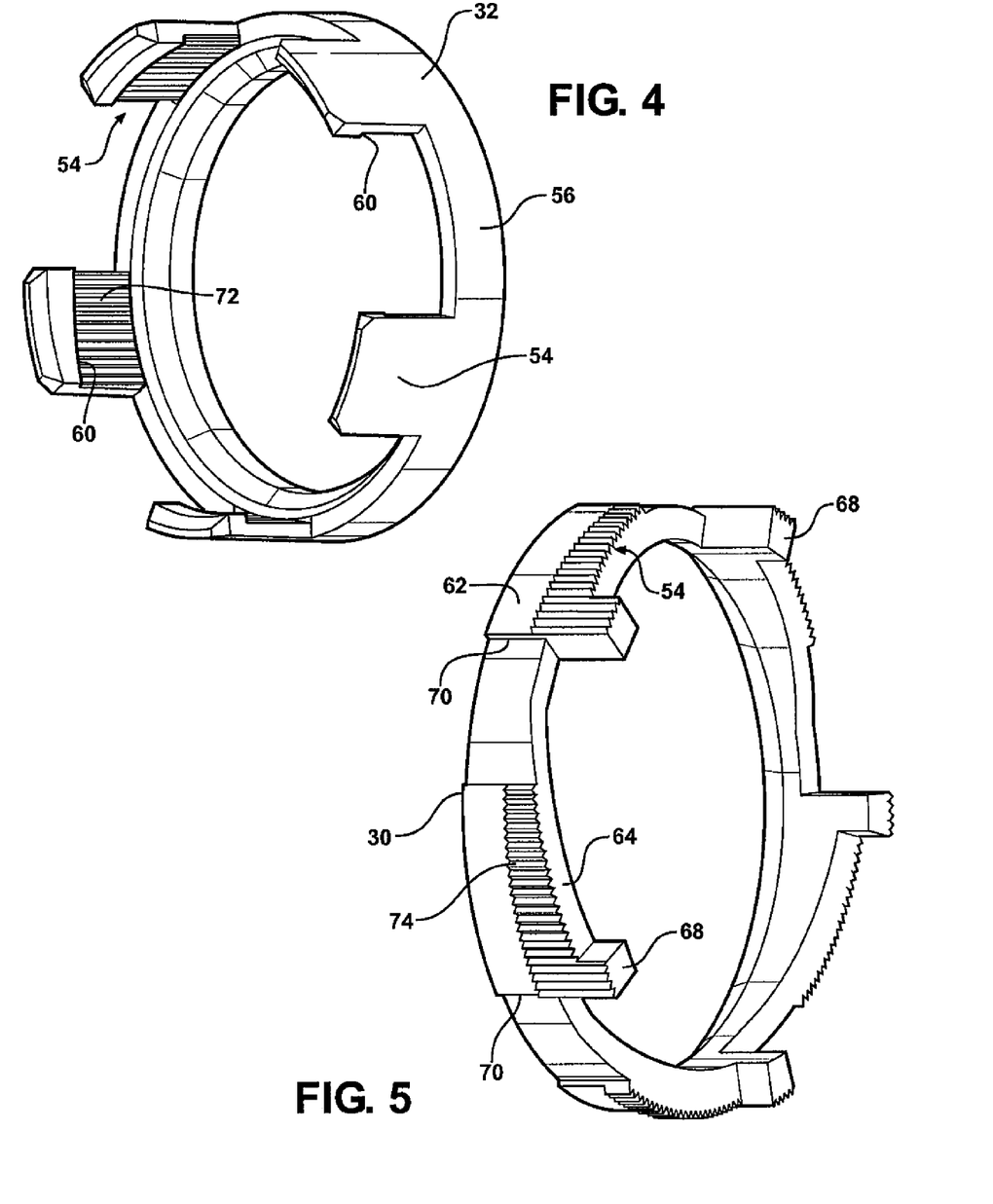
FIG. 4 is a perspective view of a first outer race half of the first embodiment of the bearing assembly.
FIG. 5 is a perspective view of a second outer race half of the first embodiment of the bearing assembly.
Figure 6:
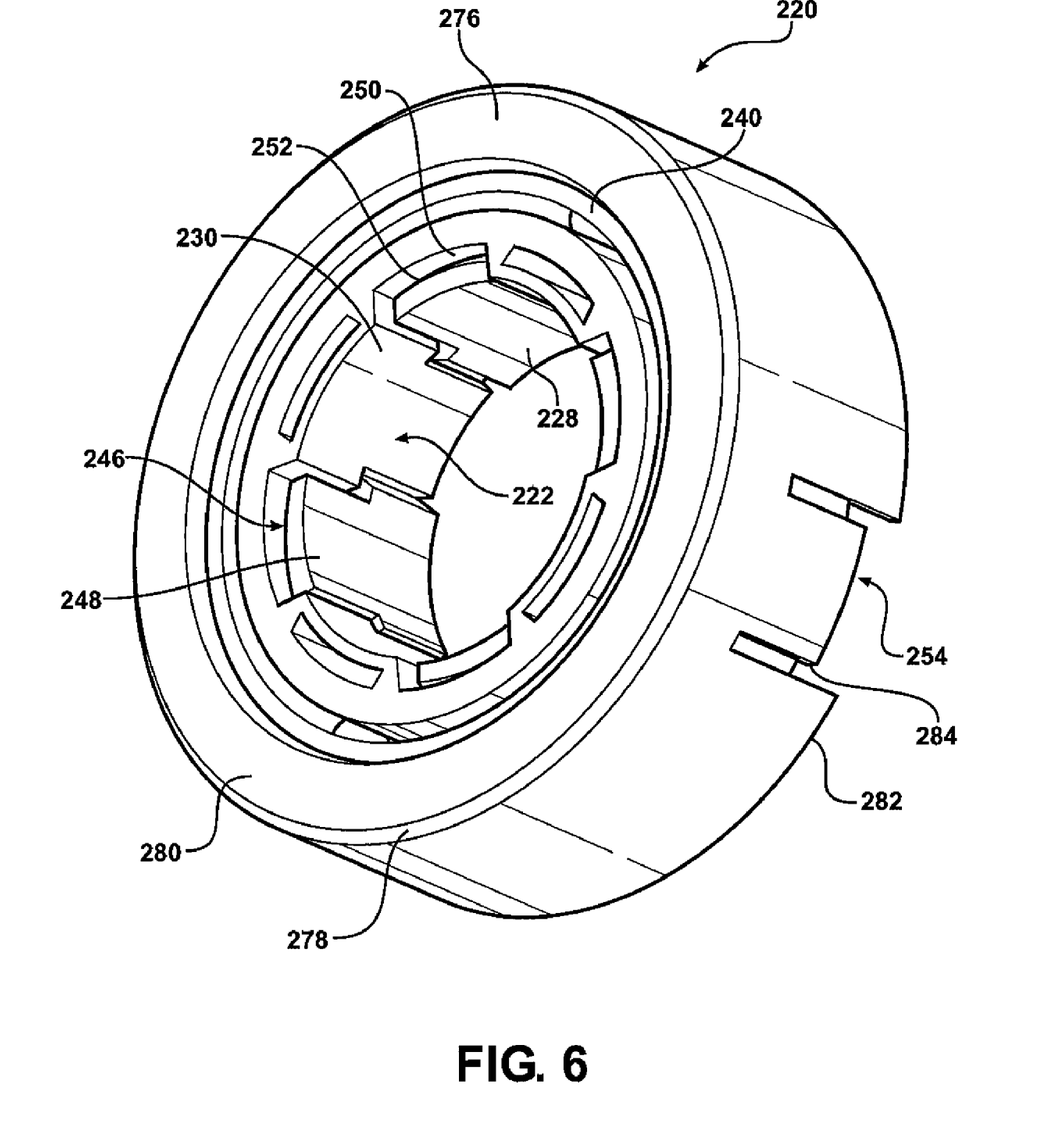
FIG. 6 is a perspective view of a second alternative embodiment of the bearing assembly.

Referring to FIGS. 1-5, the first alternative embodiment of the bearing assembly is shown generally at 20. Referring to FIGS. 1 and 4, the first outer race half 32 includes a ring portion 56 and a plurality of finger portions 58. The finger portions 58 extend outward away from the ring portion 56. The finger portions 58 extend outward along the longitudinal axis 26 to a distal end. Preferably, the plurality of finger portions 58 is evenly spaced radially about the longitudinal axis 26. However, it should be appreciated that the number and location of the finger portions 58 may vary from that shown.

Each of the plurality of finger portions 58 includes a follower surface 60 disposed transverse to the longitudinal axis 26. The plurality of follower surfaces 60 are disposed radially about the longitudinal axis 26, and generally spiral about the longitudinal axis 26. The follower surface 60 is axially spaced from the ring portion 56 along the longitudinal axis 26.

Referring to FIGS. 1 and 5, the second outer race half 34 includes a body portion 62 and a plurality of ramps 64. The ramps 64 extend axially outward from the body portion 62 along the longitudinal axis 26. The ramps 64 are disposed radially about the longitudinal axis 26, and generally spiral about the longitudinal axis 26. The follower surface 60 of each of the plurality of finger portions 58 engages one of the plurality of ramps 64 in camming engagement. The interaction between the follower surfaces 60 and the ramps 64 provides a camming mechanism to provide compressive movement of the first outer race half 32 relative to the second outer race half 34 along the longitudinal axis 26. In other words, as the first outer race half 32 is rotated about the longitudinal axis 26 relative to the second outer race half 34, the follower surfaces 60 ride along the ramps 64 and drives the second outer race half 34 inward toward the first outer race half 32 to compress the second outer race 24 against the first outer race half 32.

Each of the plurality of ramps 64 include a stop 68. The stops 68 prevent over-rotation between the first outer race half 32 and the second outer race half 34 about the longitudinal axis 26. Accordingly, the stops 68 prevent the follower surface 60 from rotating beyond a pre-determined point and becoming disengaged from the ramps 64. As shown, the stop 68 includes a block disposed at a distal end of each of the ramps 64. However, it should be appreciated that the stop 68 may include some other device or configuration suitable to prevent over-rotation of the first outer race half 32 relative to the second outer race half 34.

The body portion 62 of the second outer race half 34 defines a plurality of notches 70. The notches 70 extend axially along the longitudinal axis 26 across the body portion 62 of the second outer race half 34. The plurality of notches 70 provides radial clearance for the follower surface 60 on each of the plurality of finger portions 58 to pass as the bearing assembly 20 is manufactured. The notches 70 are necessary because the follower surfaces 60 on the plurality of finger portions 58 extend radially inward toward the longitudinal axis 26 from each of the plurality of finger portions 58.

Referring also to FIG. 4, each of the plurality of finger portions 58 includes serrations 72 extending longitudinally along the longitudinal axis 26 between the ring portion 56 and the follower surface 60. The plurality of ramps 64 each includes a plurality of ridges 74 also extending longitudinally along the longitudinal axis 26. The ridges 74 are disposed on an outer surface of the ramps 64. The ridges 74 are in interlocking engagement with the serrations 72 on the first outer race half 32. The interlocking engagement between the serrations 72 and the ridges 74 restricts rotation between the first outer race half 32 and the second outer race half 34 about the longitudinal axis 26. Accordingly, during manufacture of the bearing assembly 20, the first outer race half 32 is rotated relative to the second outer race half 34, with the follower surface 60 and the ramps 64 engaging each other to provide the camming motion as described above. Once the first outer race half 32 and the second outer race half 34 are properly positioned relative to each other, the interlocking engagement between the serrations 72 and the ridges 74 resists rotational movement and retains the positions of the first outer race half 32 and the second outer race half 34 relative to each other.

Referring to FIGS. 6-9, a second alternative embodiment of the bearing assembly is generally shown at 220. Features of the second alternative embodiment of the bearing assembly 220 that are similar to the first alternative embodiment of the bearing assembly 20 are identified by the same numerical reference number preceded by the numeral two (2). For example, the first inner race half of the first alternative embodiment of the bearing assembly 20 is identified by the reference numeral 28, and the first inner race half of the second alternative embodiment of the bearing assembly 220 is identified by the reference numeral 228.

The inner race 222 of the second alternative embodiment of the bearing assembly 220, including the first inner race half 228 and the second inner race half 230, are identical to the inner race 22 described in the first alternative embodiment of the bearing assembly 20 and shown in FIGS. 1-5. Similarly, the cage assembly of the second alternative embodiment of the bearing assembly 220, including the annular cage 240 and the plurality of rollers 242, is identical to the cage assembly described in the first alternative embodiment of the bearing assembly 20 and shown in FIGS. 1-5.

Figure 8:
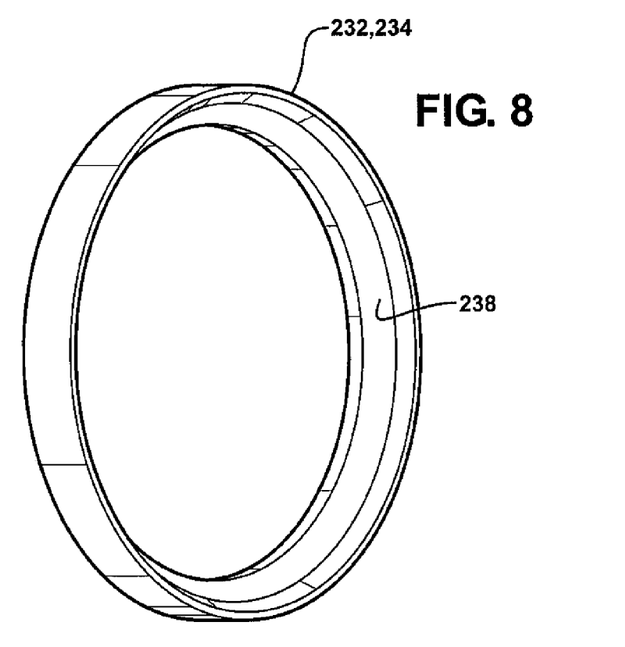
FIG. 8 is a perspective view of one of a first outer race half and a second outer race half of the second alternative embodiment of the bearing assembly.

In the second alternative embodiment of the bearing assembly 220, the first outer race half 232 and the second outer race half 234 are symmetrical about a plane perpendicular to the longitudinal axis 226. FIG. 8 shows one of the symmetrical first outer race half 232 and the second outer race half 234. The outer coupling mechanism 254 includes an annular sleeve 276 disposed about an outer periphery of both the first outer race half 232 and the second outer race half 234. The annular sleeve 276 engages the first outer race half 232 and the second outer race half 234 in axial clamping engagement to restrain movement of both the first outer race half 232 and the second outer race half 234 along the longitudinal axis 226.

Figure 9:
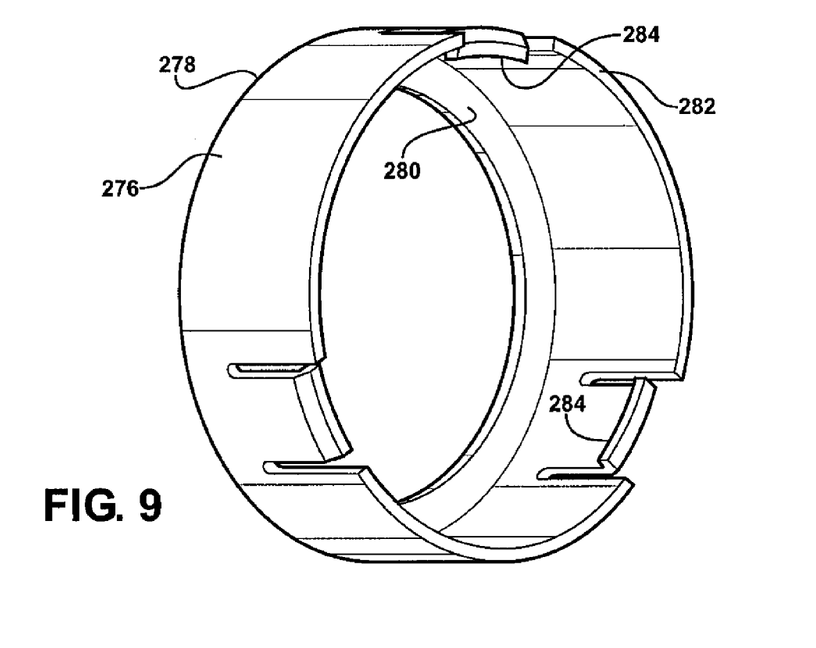
FIG. 9 is a perspective view of an annular ring of the second alternative embodiment of the bearing assembly.

The annular sleeve 276 includes a first edge 278 and an annular shoulder 280 extending radially inward toward the longitudinal axis 226 from the first edge 278. The annular shoulder 280 abuts one of the first outer race half 232 and the second outer race half 234. The annular sleeve 276 further includes a second edge 282 axially spaced from the first edge 278 along the longitudinal axis 226. At least one detent 284, but preferably a plurality of detents 284, is disposed adjacent to the second edge 282. The detents 284 grasp one of the first outer race half 232 and the second outer race half 234 and restrain the first outer race half 232 and the second outer race half 234 against the annular shoulder 280. Accordingly, one of the first outer race half 232 and the second outer race half 234 abuts the annular shoulder 280 and the other of the first outer race half 232 and the second outer race half 234 is engaged by the detents 284.

As best shown in FIG. 7 in the second alternative embodiment of the bearing assembly 220, a spring 286 is disposed between the outer race 224 and the annular shoulder 280 of the annular sleeve 276. The spring 286 biases the first outer race half 232 and the second outer race half 234 together to pre-load the bearing assembly 220. Preferably, the spring 286 includes a wave spring. However, it should be appreciated that the spring 286 may include some other type of spring not shown or described herein.

Referring to FIG. 10, a third alternative embodiment of the bearing assembly is generally shown at 320. Features of the third alternative embodiment of the bearing assembly 320 that are similar to either the first alternative embodiment of the bearing assembly 20 and/or the second alternative embodiment of the bearing assembly 220 are identified by the same last two digits of the numerical reference number preceded by the numeral three (3). For example, the first inner race half of the first alternative embodiment of the bearing assembly 20 is identified by the reference numeral 28, and the first inner race half of the third alternative embodiment of the bearing assembly 320 is identified by the reference numeral 328. Similarly, the annular sleeve of the second alternative embodiment of the bearing assembly 220 is identified by the reference numeral 276, and the annular sleeve of the third alternative embodiment of the bearing assembly 320 is identified by the reference numeral 376.

The inner race 322 of the third alternative embodiment of the bearing assembly 320, including the first inner race half 328 and the second inner race half 330, are identical to the inner race 22 described in the first alternative embodiment of the bearing assembly 20 and shown in FIGS. 1-5. Similarly, the cage assembly of the third alternative embodiment of the bearing assembly 320, including the annular cage 340 and the plurality of rollers 342, is identical to the cage assembly described in the first alternative embodiment of the bearing assembly 20 and shown in FIGS. 1-5.

In the third alternative embodiment of the bearing assembly 320, the annular sleeve 376 includes an annular collar 388 disposed at the second edge 382 of the annular sleeve 376, instead of the detents 284 shown in the second alternative embodiment of the bearing assembly 220. The annular collar 388 extends radially inward from the second edge 382 of the annular sleeve 376 inward toward the longitudinal axis 326. The annular collar 388 and the annular shoulder 380 sandwich the first outer race half 332 and the second outer race half 334 therebetween. One of the annular shoulder 380 and the annular collar 388 is deformed, such as by crimping or the like, after the annular sleeve 376 is positioned over the first outer race half 332 and the second outer race half 334 to thereby restrain relative axial movement between the first outer race half 332 and the second outer race half 334.

As described above for the second alternative embodiment of the bearing assembly 220, the third alternative embodiment of the bearing assembly 320 includes the spring 386 disposed between the outer race 324 and the annular shoulder 380 of the annular sleeve 376. As described above, the spring 386 biases the first outer race half 332 and the second outer race half 334 together.

Referring to FIG. 11, a fourth alternative embodiment of the bearing assembly is generally shown at 420. Features of the fourth alternative embodiment of the bearing assembly 420 that are similar to either the first alternative embodiment of the bearing assembly 20, the second alternative embodiment of the bearing assembly 220 and/or the third alternative embodiment of the bearing assembly 320 are identified by the same last two digits of the numerical reference number preceded by the numeral four (4). For example, the first inner race half of the first alternative embodiment of the bearing assembly 20 is identified by the reference numeral 28, and the first inner race half of the fourth alternative embodiment of the bearing assembly 420 is identified by the reference numeral 428. Similarly, the annular sleeve of the third alternative embodiment of the bearing assembly 320 is identified by the reference numeral 376, and the annular sleeve of the fourth alternative embodiment of the bearing assembly 420 is identified by the reference numeral 476.

The inner race 422 of the fourth alternative embodiment of the bearing assembly 420, including the first inner race half 428 and the second inner race half 430, are identical to the inner race 22 described in the first alternative embodiment of the bearing assembly 20 and shown in FIGS. 1-5. Similarly, the cage assembly of the fourth alternative embodiment of the bearing assembly 420, including the annular cage 440 and the plurality of rollers 442, is identical to the cage assembly described in the first alternative embodiment of the bearing assembly 20 and shown in FIGS. 1-5.

In the fourth alternative embodiment of the bearing assembly 420, the annular sleeve 476 includes a first annular portion 490 and a second annular portion 492 attached to the first annular portion 490. The first annular portion 490 includes the annular shoulder 480, and the second annular portion 492 includes the annular collar 488. The first annular portion 490 and the second annular portion 492 are positioned about the outer periphery of the first outer race half 432 and the second outer race half 434 so that the first annular portion 490 and the second annular portion 492 are disposed in at least partial overlapping engagement with each other along the longitudinal axis 426. The first annular portion 490 and the second annular portion 492 are then attached together, such as by welding, chemical adhesion, fasteners, or in some other suitable manner appropriate for the material utilized to manufacture the first annular portion 490 and the second annular portion 492.

Referring to FIG. 12, a fifth alternative embodiment of the bearing assembly is generally shown at 520. Features of the fifth alternative embodiment of the bearing assembly 520 that are similar to either the first alternative embodiment of the bearing assembly 20, the second alternative embodiment of the bearing assembly 220, the third alternative embodiment of the bearing assembly 320 and/or the fourth alternative embodiment of the bearing assembly 420 are identified by the same last two digits of the numerical reference number preceded by the numeral five (5). For example, the first inner race half of the first alternative embodiment of the bearing assembly 20 is identified by the reference numeral 28, and the first inner race half of the fifth alternative embodiment of the bearing assembly 520 is identified by the reference numeral 528. Similarly, the annular sleeve of the third alternative embodiment of the bearing assembly 320 is identified by the reference numeral 376, whereas the annular sleeve of the fourth alternative embodiment of the bearing assembly 420 is identified by the reference numeral 476.

The inner race 522 of the fifth alternative embodiment of the bearing assembly 520, including the first inner race half 528 and the second inner race half 530, are identical to the inner race 22 described in the first alternative embodiment of the bearing assembly 20 and shown in FIGS. 1-5. Similarly, the cage assembly of the fifth alternative embodiment of the bearing assembly 520, including the annular cage 540 and the plurality of rollers 542, is identical to the cage assembly described in the first alternative embodiment of the bearing assembly 20 and shown in FIGS. 1-5.

In the fifth alternative embodiment of the bearing assembly 520, the outer coupling mechanism 554 includes each of the first outer race half 532 and the second outer race half 534 cooperating together to define a plurality of apertures 594. The apertures 594 extend through both the first outer race half 532 and the second outer race half 534 along the longitudinal axis 526. The apertures 594 are radially spaced about the longitudinal axis 526, and are radially spaced from the longitudinal axis 526. It should be appreciated that the number of apertures 594 may vary and the specific radial location of the apertures 594 about the longitudinal axis 526 may vary from that shown in the Figures.

Figure 12A:
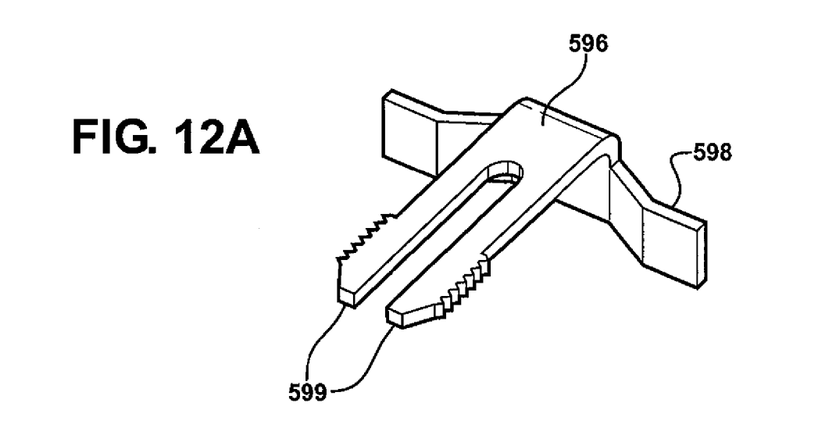
FIG. 12A is a perspective view of a lock for the fifth alternative embodiment of the bearing assembly.

In the fifth alternative embodiment of the bearing assembly 520, the outer coupling mechanism 554 further includes a plurality of locks 596. One of the plurality of locks 596 is disposed within each of the plurality of apertures 594 in interlocking engagement with the first outer race half 532 and the second outer race half 534. The locks 596 are a push pin style of lock 596 that includes a flange 598 for abutting one of the first outer race half 532 and the second outer race half 534, and includes a pair of arms 599 extending through the apertures 594 that grasp the other of the first outer race half 532 and the second outer race half 534. It should be appreciated that the shape and configuration of the locks 596 may be different than that shown or described herein.

The subject invention also provides a method of assembling the bearing assembly 20. The method comprises the steps of positioning one of the plurality of rollers 42 within each of the plurality of openings 44 of the annular cage 40 to define a cage 40 assembly 20. The method further comprises the step of positioning the first inner race half 28 adjacent to and concentric with the cage 40 assembly 20 about a longitudinal axis 26. The method further comprises the step of positioning the second inner race half 30 adjacent to and concentric with the cage 40 assembly 20 and across from the first inner race half 28. It should be appreciated that the rollers 42 are supported by the inner annular groove 36.

The method further comprises the step of coupling the first inner race half 28 and the second inner race half 30 together. As described above, the first inner race half 28 and the second inner race half 30 include a snap fit connection therebetween. The step of coupling the first inner race half 28 to the second inner race half 30 may be further defined as compressing the first inner race half 28 and the second inner race half 30 together along the longitudinal axis 26 to engage the snap fit connection between the first inner race half 28 and the second inner race half 30. In other words, the first inner race half 28 and the second inner race half 30 are compressed together so that the extensions 48 disposed on the first inner race half 28 and the second inner race half 30 extend across and grasp the other of the first inner race half 28 and the second inner race half 30. Specifically, the first inner race half 28 and the second inner race half 30 are compressed until the lips 52 on the extensions 48 grasp in interlocking engagement the ledge 50 on the other of the first inner race half 28 and the second inner race half 30.

The method further comprises the step of positioning the first outer race half 32 adjacent to and concentric with the cage 40 assembly 20, and radially offset from the first inner race half 28 opposite the cage 40 assembly 20. The method further comprises the step of positioning the second outer race half 34 adjacent to and concentric with the cage 40 assembly 20, and radially offset form the second inner race half 30 opposite the cage 40 assembly 20, and The method further comprises the step of coupling the first outer race half 32 and the second outer race half 34 together. As described above, the bearing assembly 20 includes an outer coupling mechanism 54, 254, 354, 454, 554 that varies with the different alternative embodiments of the bearing assembly 20, 220, 320, 420, 520.

As described above in the first alternative embodiment of the bearing assembly 20, the bearing assembly 20 includes a cam mechanism between the first outer race half 32 and the second outer race half 34. The step of coupling the first outer race half 32 and the second outer race half 34 together further includes the step of rotating the first outer race half 32 relative to the second outer race half 34 about the longitudinal axis 26 to provide camming motion and compress the first outer race half 32 and the second outer race half 34. In the first alternative embodiment of the bearing assembly 20, the method may further comprise the step of securing the position of the first outer race half 32 relative to the second outer race half 34 after compressing the first outer race half 32 and the second outer race half 34. As described above, the relative positions of the first outer race half 32 and the second outer race half 34 of the first alternative embodiment of the bearing assembly 20 is secured through the interlocking engagement between the serrations 72 on the first outer race half 32 and the ridges 74 on the second outer race half 34.

As described above in the second, third and fourth alternative embodiments of the bearing assembly 220, 320, 420, the bearing assembly 220, 320, 420 includes an annular sleeve 726, 376, 476 disposed about an outer periphery of the first outer race half 232, 332, 432 and the second outer race half 234, 334, 434. The step of coupling the first outer race half 232, 332, 432 and the second outer race half 234, 334, 434 together is further defined as coupling the annular sleeve 276, 376, 476 to both the first outer race half 232, 332, 432 and the second outer race half 234, 334, 434. The step of coupling the annular sleeve 276, 376, 476 to the first outer race half 232, 332, 432 and the second outer race half 234, 334, 434, to thereby couple the first outer race half 232, 332, 432 and the second outer race half 234, 334, 434 together, varies with the different alternative embodiments of the bearing assembly 220, 320, 420.

In the second alternative embodiment of the bearing assembly 220, the annular sleeve 276 is coupled to the first outer race half 232 and the second outer race half 234 by sliding the annular sleeve 276 over the first outer race half 232 and the second outer race half 234 until one of the first outer race half 32 and the second outer race half 234 engages the annular shoulder 280 of the annular sleeve 276 and the other of the first outer race half 232 and the second outer race half 234 engages the detents 284 of the annular sleeve 276 in interlocking engagement.

In the third alternative embodiment of the bearing assembly 320, the annular sleeve 376 is coupled to the first outer race half 332 and the second outer race half 334 by deforming the second edge 382 of the annular sleeve 376 to form the annular collar 388. Once the annular collar 388 is formed, the first outer race half 332 and the second outer race half 334 are sandwiched between the annular shoulder 380 and the annular collar 388.

In the fourth alternative embodiment of the bearing assembly 420, the annular sleeve 476 is coupled to the first outer race 424 and the second outer race 424 by positioning the first annular portion 490 and the second annular portion 492 about the first outer race half 432 and the second outer race half 434, and then attaching the first annular portion 490 to the second annular portion 492, thereby trapping the first outer race 424 and the second outer race 424 between the annular shoulder 480 of the first annular portion 490 and the annular collar 488 of the second annular portion 492.

As described above in the Fifth alternative embodiment of the bearing assembly 520, the outer coupling mechanism 554 includes the first outer race half 532 and the second outer race 524 cooperating to define a plurality of apertures 594 therethrough, and a plurality of locks 596 extending through the apertures 594. The step of coupling the first outer race half 532 and the second outer race half 534 is further defined as inserting the locks 596 through the apertures 594 to secure the locks 596 to both the first outer race half 532 and the second outer race half 534.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method of assembling a bearing assembly including an inner race having a first inner race half and a second inner race half, and outer race having a first outer race half and a second outer race half, a plurality of rollers and an annular cage defining a plurality of openings, said method comprising the steps of:
    positioning one of the plurality of rollers within each of the plurality of openings of the annular cage to define a cage assembly;
    positioning the first inner race half adjacent to and concentric with the cage assembly about a longitudinal axis;
    positioning the second inner race half adjacent to and concentric with the cage assembly and across from the first inner race half;
    positioning the first outer race half adjacent to and concentric with the cage assembly and radially offset from the first inner race half opposite the cage assembly;
    positioning the second outer race half adjacent to and concentric with the cage assembly and radially offset form the second inner race half opposite the cage assembly; and
    coupling the first inner race half and the second inner race half together.

2. The method as set forth in claim 1 wherein said first inner race half and said second inner race half include a snap fit connection therebetween and the step of coupling the first inner race half to the second inner race half is further comprises compressing the first inner race half and the second inner race half together along the longitudinal axis to engage the snap fit connection between the first inner race half and the second inner race half.

3. The method as set forth in claim 1 further comprising the step of coupling the first outer race half and the second outer race half together.

4. The method as set forth in claim 3 wherein the bearing assembly includes an annular sleeve disposed about an outer periphery of the first outer race half and the second outer race half and the step of coupling the first outer race half and the second outer race half together is further defined as coupling the annular sleeve to both the first outer race half and the second outer race half.

5. The method as set forth in claim 3 wherein the bearing assembly includes a snap fit connection between the first outer race half and the second outer race half and the step of coupling the first outer race half and the second outer race half together is further defined as compressing the first outer race half and the second outer race half together along the longitudinal axis to engage the snap fit connection between the first outer race half and the second outer race half.

6. The method as set forth in claim 3 wherein the bearing assembly includes a cam mechanism between the first outer race half and the second outer race half and the step of coupling the first outer race half and the second outer race half together further includes the step of rotating the first outer race half relative to the second outer race half about the longitudinal axis to compress the first outer race half and the second outer race half.

7. The method as set forth in claim 6 further comprising the step of securing the position of the first outer race half relative to the second outer race half after compressing the first outer race half and the second outer race half.

* * * * *